July 14, 1970     E. W. VEST ET AL     3,520,338

AUTOMATIC LIQUID DISPENSING NOZZLE

Filed Sept. 29, 1967     3 Sheets-Sheet 1

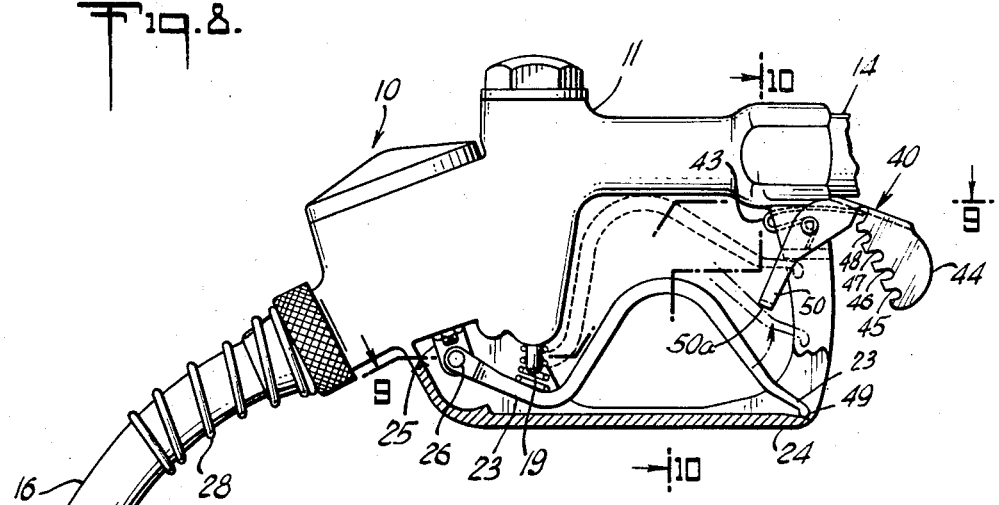
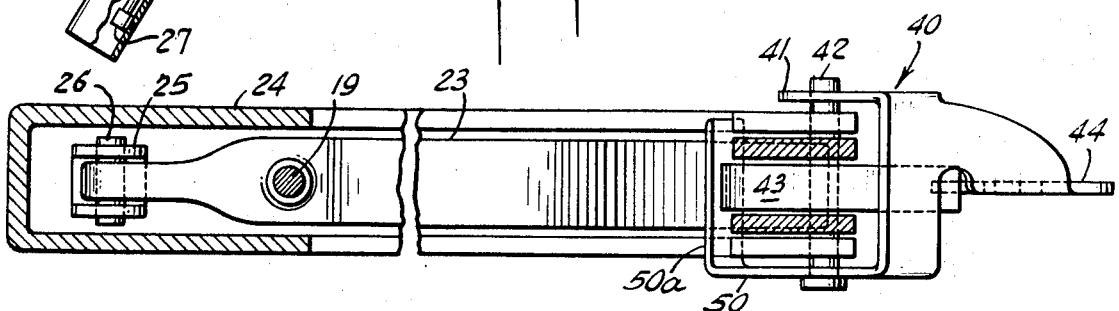
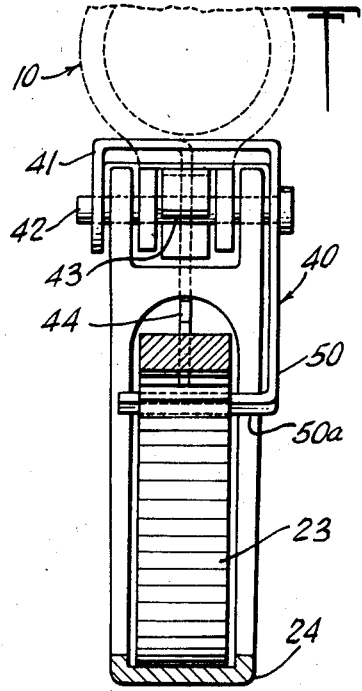
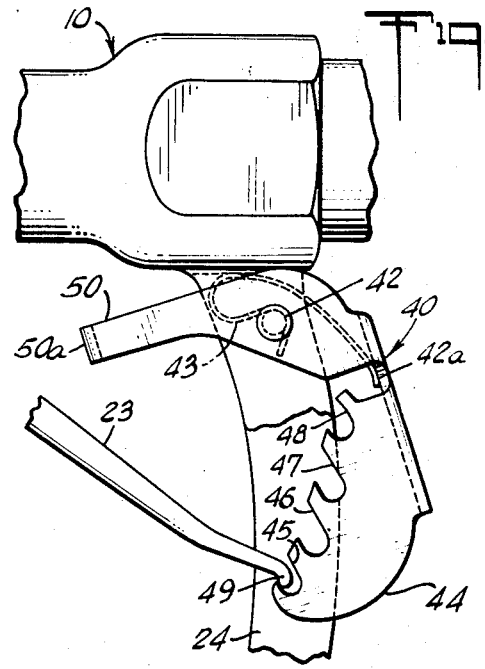

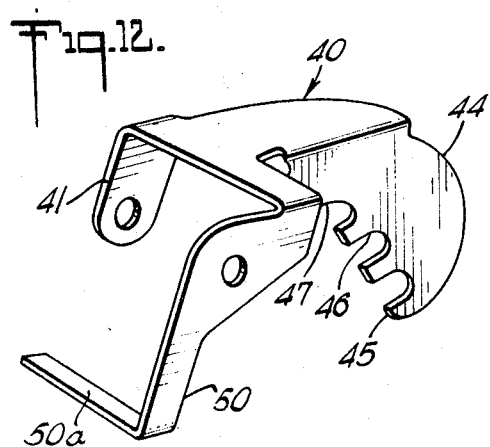
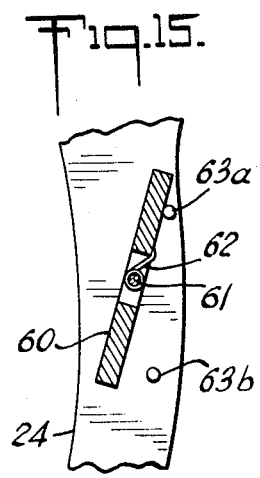
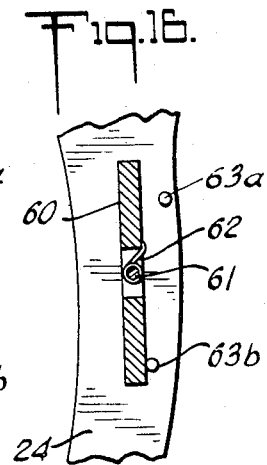
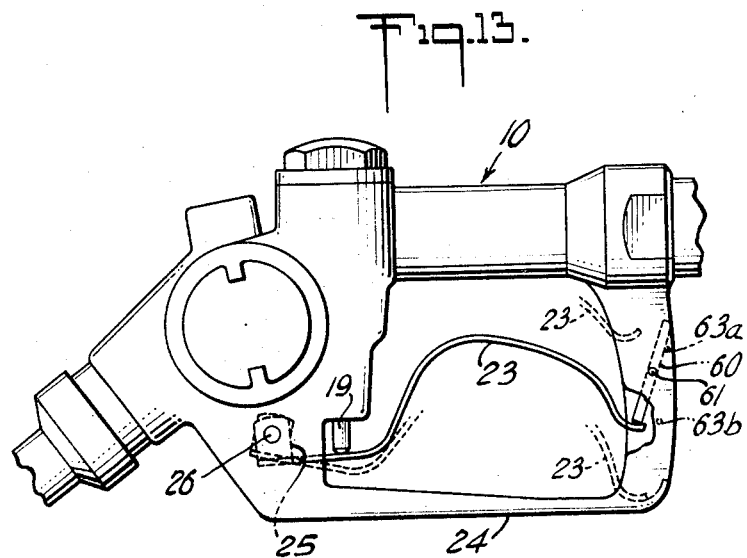
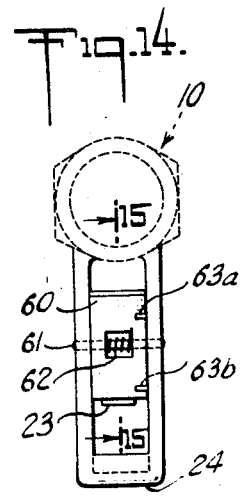
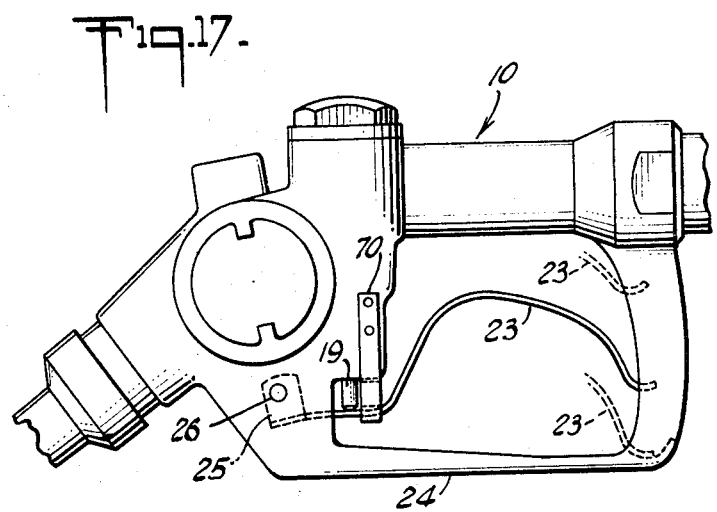
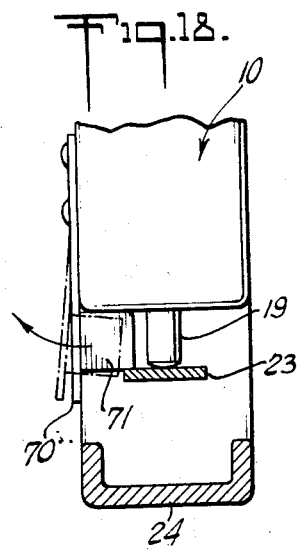

United States Patent Office 3,520,338
Patented July 14, 1970

3,520,338
AUTOMATIC LIQUID DISPENSING NOZZLE
Eugene W. Vest, Wappingers Falls, and Dean C. McGahey, Fishkill, N.Y., and Richard H. Griswold, Houston, Tex., assignors to Texaco Inc., New York, N.Y., a corporation of Delaware
Filed Sept. 29, 1967, Ser. No. 671,742
Int. Cl. B65b 3/24; B67d 5/28, 5/372
U.S. Cl. 141—128
5 Claims

ABSTRACT OF THE DISCLOSURE

An automatic liquid dispensing nozzle wherein a lever, used to activate a control valve and regulate the rate of flow therethrough, is engaged by a holding means against the control valve, being released therefrom by automatic means upon the liquid being dispensed reaching a predetermined level, and subsequently being engaged by manual operation against a restraining member which permits the filling operation to be completed at a predetermined low rate of flow.

BACKGROUND OF THE INVENTION

This invention relates generally to a method of and apparatus for dispensing a liquid into a receptacle and more specifically to one wherein the initial filling operation is accomplished by automatic means at a high rate of flow and the final filling operation is accomplished at a predetermined low flow rate, thereby allowing the receptacle to be substantially filled with little probability of overflow or spillage.

The usage of automatic dispensing nozzles at gasoline service stations has greatly decreased the time required to adequately service an automobile, since the station attendant is now free to perform other services while the gasoline tank is being filled. A variety of automatic dispensing nozzles are presently known and utilized in the art, with nozzles of this general variety being described in U.S. Pat. Nos. 2,528,747, 2,582,195 and 3,196,908, the disclosures of which are incorporated herein by this reference thereto.

In the operation of nozzles of this type, after the automatic tank filling operation is completed, usually a significant unfilled volume remains in the average automobile tank. Service station attendants, generally, then manually engage the lever against the nozzle control valve in order to discharge the amount of liquid necessary to fill the tank as completely as possible. This final operation is accomplished most effectively at a relatively low flow rate. It is difficult, however, for the attendant to manually position and retain the lever against the control valve in the optimum position and complete the operation without some overflow or spillage. To eliminate this problem, a novel device has been developed for restricting the movement of the lever, thereby enabling the tank filling operation to be completed at a predetermined low rate of flow, thereby reducing, if not eliminating for all practical purposes, the chances of wasteful and dangerous spillage of gasoline.

SUMMARY OF THE INVENTION

The invention herein disclosed provides a holding means for engaging a lever against a nozzle control valve, thereby permitting the discharge of fluid into a receptacle, without the necessity for an attendant to operate the apparatus. When the liquid reaches a predetermined level in the receptacle and contact means provided in the nozzle, the lever is disengaged from the holding means and the control valve is rendered inoperative. Means are provided for completing the filling of the receptacle at a low rate of flow by engaging the lever against a restraining member which restricts the opening of the nozzle control valve.

The principal advantage made possible by the use of this invention over prior art methods is that the tank may be substantially filled without the familiar overflow or spillage. When the attendant attempts to complete the filling of the tank by means disclosed in the prior art, opening of the control valve too much causes the fluid to be discharged at a high flow rate and almost immediately results in back up and overflow. As a result, either the customer is inadequately serviced in that the tank is not completely filled and/or an unwanted amount of the fluid overflows. With the apparatus herein disclosed, a substantially full tank of gasoline is provided the consumer without any undesirable overflow and spillage during normal operation.

Accordingly, it is a primary object of this invention to provide a simple and reliable apparatus to dispense liquid into a receptacle which reduces the danger of spillage.

A further object of this invention is to provide a novel method wherein liquid is dispensed into the receptacle at a predetermined low flow rate during the completion of the receptacle filling operation.

These and other objects, advantages and features of the invention will become more apparent from the following description taken in conjunction with the accompanying drawing.

BRIEF DESCRIPTION OF THE DRAWING

FIG. 8 is a side elevation view of a liquid dispensing nozzle with a pivoted engaging member for the operating lever;

FIG. 9 is a plan view of the nozzle with the pivoted operating lever engaging member taken approximately along line 9—9 of FIG. 8;

FIG. 10 is an end view of the nozzle with a pivoted operating lever engaging member taken approximately along line 10—10 of FIG. 8;

FIG. 11 is a fragmentary side elevation view of the friction latch engaging the operating lever;

FIG. 12 is an isometric view of the operating lever engaging member;

FIG. 13 is a fragmentary side elevation view of a liquid dispensing nozzle and a pivotally mounted plate-like restraining member for the operating lever;

FIG. 14 is an end elevation view of a liquid dispensing nozzle and a pivotally mounted plate-like restraining member for the operating lever;

FIG. 15 is a fragmentary side elevation view of the pivotally mounted plate-like restraining member in the restraining position taken approximately along line 15—15 of FIG. 14;

FIG. 16 is a fragmentary side elevation view of the pivotally mounted plate-like restraining member in the automatic filling position for the nozzle;

FIG. 17 is a fragmentary side elevation view of a liquid dispensing nozzle and a flexible plate-like restraining member for the operating lever; and FIG. 18 is a fragmentary end view of the nozzle and the flexible plate-like restraining member of FIG. 17.

DESCRIPTION OF THE PREFERRED EMBODIMENT

Figure 1:
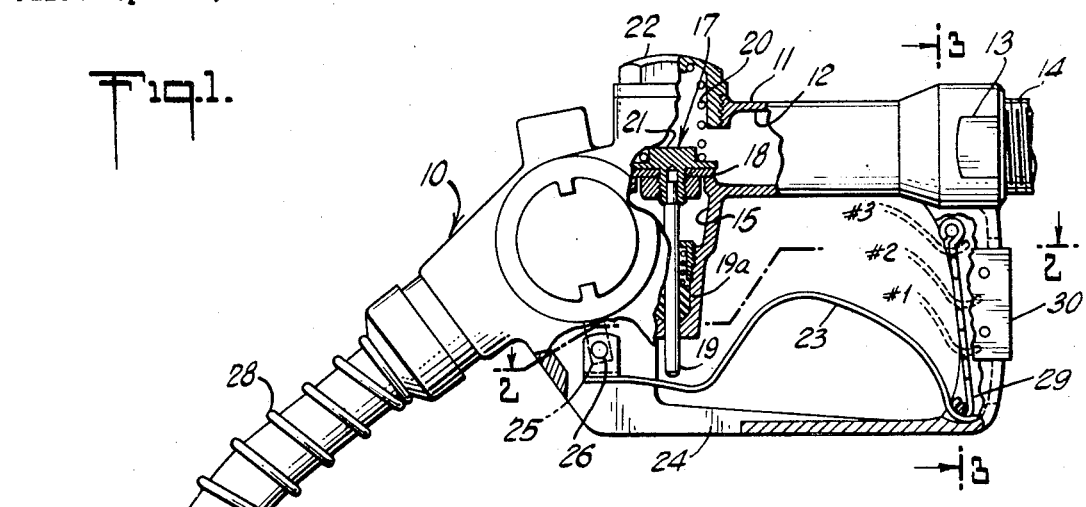
FIG. 1 is a side elevation, partly in cross section, of a liquid dispensing nozzle with the fixed restraining member for the operating lever.

With reference to the drawings, the liquid dispensing nozzle, indicated generally at 10, comprises a main nozzle body 11 having a liquid conduit 12 therethrough. At the rearward end of the nozzle 10, is a threaded inlet fitting 13, which provides a means for connection to a hose 14. The hose 14 is connected to a pump in communication with the source, e.g. an underground tank, of the liquid to be dispensed. The liquid passes through the liquid conduit 12 to the cavity indicated at 15 and then through the spout 16 at the forward end of the nozzle. A control valve 17 is interposed between the liquid conduit 12 and the cavity 15 in order to regulate the amount of liquid flow. The control valve 17, comprises a valve seat indicated at 18, with the opening and closing thereof being regulated by the actuating rod 19. A spring 20, seated on valve member 21 and having its upward end bearing against a cap 22, provides the self closing mechanism for the valve assembly. Cap 22 is provided to facilitate easy removal and repair of the control valve 17. The actuating rod 19 is engaged by an operating lever 23 and provides the means for controlling the rate of liquid flow through the nozzle. A sealing member 19a is spaced about actuating rod 19 to preclude any liquid leakage therethrough.

Accidental engagement of the actuating rod 19 by the operating lever 23 is prevented by means of a lever guard 24, which generally is an integral part of the main nozzle body 11. The operating lever 23 is fulcrumed to a release plunger 25 which provides a means for releasing the operating lever 23 from the actuating rod 19 when the dispensed liquid reaches a predetermined level. During the filling operation, when the liquid contacts the opening 27 of a control fitting located near the discharge end of the spout 16, a diaphragm (herein not shown but disclosed in U.S. Pat. 3,196,908) is actuated, which thereby releases the plunger 25 and returns the operating lever 23 to the off position. Nozzle 10 may be provided further with a buffer spring 28 which engages the tank opening in the automobile and prevents the nozzle from inadvertently being jarred loose from the tank. The foregoing description of the operation of an automatic dispensing nozzle is abbreviated and for a more detailed description thereof, reference is made to the aforementioned U.S. patents.

Referring to FIGS. 1 to 6 inclusive, wherein one embodiment of the invention is illustrated, a latch member 29 is mounted in the back opening of the lever guard 24. The latch member 29 is formed from a spring-like material and provides a plurality of positions for engaging the operating lever 23, thereby holding the actuating rod 19 in the open position. As indicated in the drawing, latch member 29 provides three positions for engaging the lever 23, each of which allows a different flow rate. Upon the liquid reaching a predetermined level in the tank, release plunger 25 is actuated by a diaphragm, as previously described, lowering the forward end of the operating lever 23 sufficiently to cause the control valve 17 to return to the closed position and terminate the flow through the nozzle. This action also generally releases the operating lever with a force sufficient to disengage it from the latch member 29.

Figure 7:
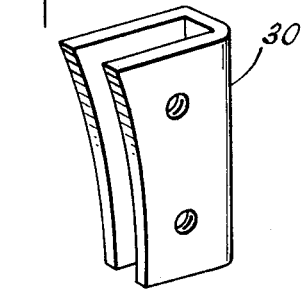
FIG. 7 is an isometric view of the restraining member.

Restraining member 30 is attached fixedly to the back portion of the lever guard 24. As illustrated in FIG. 7, the restraining member 30 comprises a U-shaped bracket with mounting holes therein, which permits fastening to a side leg of the lever guard 24.

Figure 3:
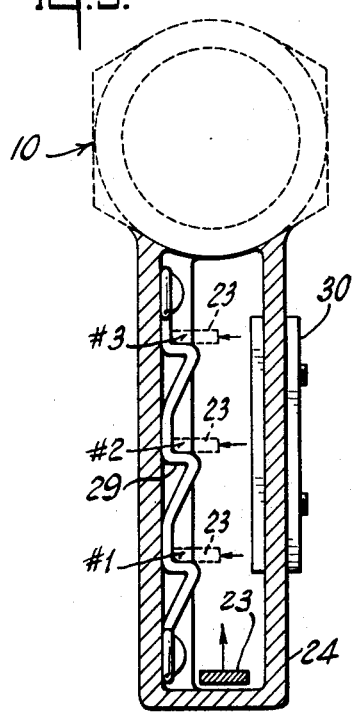
FIG. 3 is an end elevation view of the nozzle with a fixed restraining member taken approximately along line 3—3 of FIG. 1.

For the automatic filling phase of the automobile tank, the lever 23 is engaged with the latch member 29 by the attendant with an upward force in any one of the numbered positions as indicated in FIGS. 1 and 3. The numbered position to be engaged is determined by the attendant in considering the type of automobile to be filled and the desired rate of flow to be utilized. Position No. 1 opens the valve seat 18 the least, thereby permitting the lowest rate of flow, while the higher numbered positions open the valve seat 18 to a greater degree and thereby permit higher flow rates.

Figure 2:
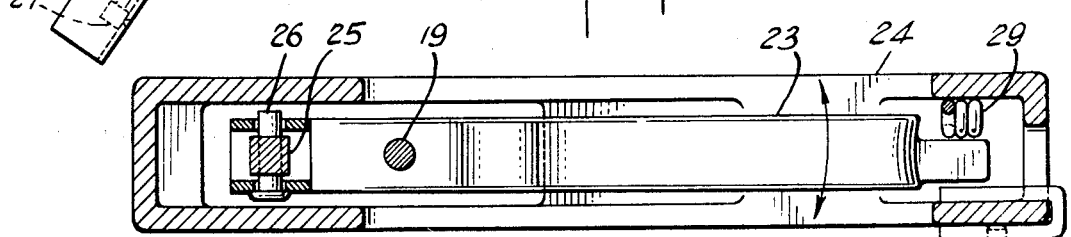
FIG. 2 is a plan view of the nozzle with the fixed restraining member taken approximately along line 2—2 of FIG. 1.
Figure 4:
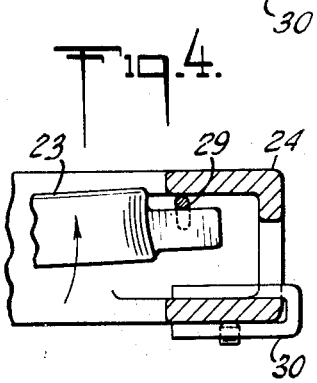
FIG. 4 is a fragmentary plan view showing the operating lever position during the automatic filling operation.
Figure 6:
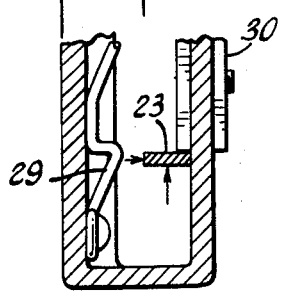
FIG. 6 is a fragmentary end elevation view taken in the direction of line 3—3 of FIG. 1 showing the lever engaging the restraining member.
Figure 5:
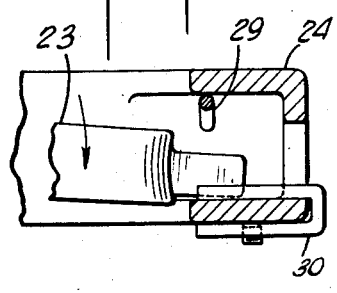
FIG. 5 is a fragmentary plan view showing the operating lever engaging the restraining member.

As illustrated in FIG. 2, the lever 23 is fulcrumed to the pivot pin 26 with a loose fit in order to permit a sufficient transverse motion of the lever such that it is capable of engaging either the latch member 29 or the restraining member 30. FIG. 4, illustrates (by the arrow) the operating lever 23 being moved with a transverse motion to engage the latch member 29. Once the tank has been substantially filled and the liquid dispensed into the tank contacts the opening 27 at the end of the nozzle 10, the automatic cut off means terminates the liquid flow through the nozzle. The lever 23 is returned to the off position and the automatic filling phase of the tank is completed. The attendant then engages the lever 23 with an upward and transverse motion, as indicated by the arrow in FIG. 5, thereby contacting the lever 23 against the restraining member 30, as shown in FIGS. 5 and 6. The restraining member 30 may be positioned so that it will engage the lever 23 at any predetermined flow rate. However, it is generally desirable to provide for a low flow rate during the completion of the tank filling operation, so that the vapors in the tank are displaced at a corresponding low rate. As described previously, upon the dispensed liquid contacting the opening 27, release plunger 25 once again disengages the lever 23 from the actuating rod 19 and thereby closes the control valve 17. If it is found desirable by the attendant to further discharge liquid into the tank, the nozzle spout 16 may be withdrawn somewhat from the tank opening and additional liquid discharged into the tank by engaging the lever 23 by manual means against the restraining member 30. In the event that the attendant wishes to dispense the liquid into the tank by manual means alone, the lever 23 may be engaged against the actuating rod 19 to achieve the desired flow rate without contacting either the latch member 29 or the restraining member 30.

FIGS. 8 to 12 inclusive illustrate an alternative mechanism to accomplish the principles of the invention herein disclosed. The lever 23 is pivoted from the release plunger 25 and engages the actuating rod 19 as described previously. A pivoted lever engaging member 40 is mounted on the back end of the lever guard 24. At its upper end the pivoted lever engaging member 40 has a yoke 41 which is supported by the lever guard 24 by means of a pivot pin 42. A spring 43 is supported by the pivot pin 42, with the other end thereof bearing against one leg of the pivoted lever engaging member 40 as at 42a. The spring 43 is biased in a manner such that it forces the pivoted lever engaging member 40 to rest in the position illustrated in FIG. 8. One leg of this member 40 comprises a friction latch 44 which has surfaces 45, 46, 47 and 48 which are adapted to engage the rounded end 49 of lever 23. Sufficient friction is provided between the friction latch 44 and the lever 23 to prevent the lever from being disengaged from the actuating rod 19 until the release plunger 25 is actuated.

As described previously, the liquid dispensed into the tank contacts the opening 27 of the control fitting at the end of the nozzle, the release plunger 25 disengages lever 23 from the friction latch 44 and the pivoted lever engaging member 40 rotates in a counterclockwise manner coming to rest with the restraining leg 50 thereof in a near vertical position, this leg being fabricated with a tab at the end thereof, as at 50a, FIG. 12. To complete the filling of the automobile tank, the attendant engages the lever 23 by manual means to activate the control valve 17. During the completion of the tank filling operation the travel of the operating lever 23 is restricted, since it engages the tab 50a of the restraining leg 50, which controls the amount that the control valve 17 is opened. With the lever 23 in this restricted position, the liquid is discharged at a low rate thereby generally allowing additional gasoline to be dispensed into the tank before it is considered filled.

FIGS. 13, 14, 15 and 16 illustrate still another embodiment of the principles of the disclosure herein. Plate-like member 60 is mounted on a pin 61 containing a torsion spring 62 with the rotational motion thereof being limited by the stops 63a and 63b. The lower leg of the plate-like member 60 provides an obstructing means and restricts the motion of the lever 23. To dispense liquid at a higher rate of flow or engage an automatic holding means for the lever 23, the attendant merely exerts a slight amount of force on the upper portion of the plate-like member 60, to counteract the rotational tendency of the spring 62 and move the plate-like member 60 out of the path of the lever 23, enabling this lever to move in an unrestricted manner, as in FIG. 16. If it is desired, the force of spring 62 may engage the plate-like member 60 in the opposite direction, whereby the manner of operation would be reversed.

FIGS. 17 and 18 illustrate still another embodiment of the invention herein disclosed. A leaf spring member 70 is attached fixedly to the main body 11 of the nozzle 10. At the end of the leaf spring 70 is a restricting member 71 used to engage the lever 23 to prevent movement thereof. When the attendant desires to engage the lever 23 to allow a high rate of liquid discharge through the nozzle, or to engage the lever 23 with an automatic holding means, the leaf spring member 70 is pulled away from the nozzle by manual means, as indicated by the arrow in FIG. 18, thereby permitting unrestricted travel of the lever 23. When the lever 23 is to be engaged against the restraining member 71 on the leaf-spring 70, e.g. when the final filling is accomplished at a low flow rate, the leaf spring 70 is left in its normal position thereby restricting the travel of the lever 23.

Thus there has been shown and described an improved method and apparatus for dispensing liquid into a receptacle whereby the receptacle is substantially filled with decreased probability of overflow or spillage.

We claim:

1. In an automatic shutoff, liquid dispensing nozzle of the type having a liquid conduit therein, a self-closing valve in said conduit for controlling liquid flow therethrough, a lever movable about a fulcrum for opening said valve, latch means engageable with said lever for latching the lever in valve open position during the filling operation, and automatic means in response to rise of fluid about the end of said nozzle for releasing said lever to permit said valve to close, the improvement which comprises a pivoted stop member movable into the path of movement of said lever to a position at which it positively prevents movement of said lever about its fulcrum a distance more than that sufficient to permit a relatively restricted, partial opening of said valve, and resilient means normally biasing said pivoted stop member in said position, said stop member being manually shiftable out of the path of said lever to permit full opening of said valve.

2. A nozzle as defined in claim 1 wherein said stop member for engaging said lever comprises a pivoted plate-like member.

3. A nozzle as defined in claim 1 wherein said stop member and said latch means comprise an integral member movable as a unit about the aforesaid pivot, such that manual engagement of the latching member with the lever shifts said stop member out of the path of said lever.

4. A nozzle as defined in claim 3 wherein said latching means and stop member are pivoted about an axis parallel to the fulcrum of said lever and wherein said latch is adapted to engage the end of said lever remote from said fulcrum.

5. In an automatic shut-off, liquid dispensing nozzle of the type having a liquid conduit therein, a self-closing valve in said conduit for controlling liquid flow therethrough, a lever movable about a fulcrum to urge said valve into open position, latch means pivotally attached to said nozzle and manually engageable with said lever for latching said lever in valve open position during the filling operation, resilient means biasing said latch to a normal position clear of said lever, and automatic means in response to rise of fluid about the nozzle for releasing said lever to permit said valve to close, the improvement which comprises a stop member integral with said latch means and rigidly associated therewith for movement with said latch about its pivot, said stop member being, in said normal position, located in the path of movement of said lever to positively prevent movement of said lever about its fulcrum beyond a point at which relatively restricted, low flow opening of the valve occurs, movement of said latching means into lever engaging position against said resilient means being effective to shift said stop member out of the path of said lever to permit full opening of said valve.

References Cited

UNITED STATES PATENTS

| 2,024,631 | 12/1935 | Etzel | 141—224 |
| 2,309,503 | 1/1943 | Frank | 141—225 X |
| 2,577,255 | 12/1951 | Logan et al. | 251—285 X |
| 3,020,940 | 2/1962 | Sutcliffe et al. | 141—225 X |

LAVERNE D. GEIGER, Primary Examiner

E. J. EARLS, Assistant Examiner

U.S. Cl. X.R.

141—206; 251—109, 284